United States Patent
Vaknin et al.

(10) Patent No.: US 9,619,696 B2
(45) Date of Patent: Apr. 11, 2017

(54) DUPLICATE REDUCTION FOR FACE DETECTION

(71) Applicant: Cisco Technology, Inc., San Jose, CA (US)

(72) Inventors: Aviva Vaknin, Jerusalem (IL); Gal Moshitch, Jerusalem (IL)

(73) Assignee: Cisco Technology, Inc., San Jose, CA (US)

(*) Notice: Subject to any disclaimer, the term of this patent is extended or adjusted under 35 U.S.C. 154(b) by 92 days.

(21) Appl. No.: 14/686,798

(22) Filed: Apr. 15, 2015

(65) Prior Publication Data
US 2016/0307029 A1 Oct. 20, 2016

(51) Int. Cl.
*G06K 9/00* (2006.01)
*G06K 9/62* (2006.01)

(52) U.S. Cl.
CPC ..... *G06K 9/00288* (2013.01); *G06K 9/00234* (2013.01); *G06K 9/00261* (2013.01); *G06K 9/00281* (2013.01); *G06K 9/00711* (2013.01); *G06K 9/00926* (2013.01); *G06K 9/6215* (2013.01)

(58) Field of Classification Search
CPC ........... G06K 9/00288; G06K 9/00234; G06K 9/00261; G06K 9/00281; G06K 9/00711; G06K 9/6215; G06K 9/00228; G06K 9/00926
USPC ......................................... 382/115, 118, 218
See application file for complete search history.

(56) References Cited

U.S. PATENT DOCUMENTS

| | | | |
|---|---|---|---|
| 7,594,177 B2 * | 9/2009 | Jojic | G06F 17/30852 715/720 |
| 7,787,665 B2 * | 8/2010 | Nakashima | H04N 5/232 348/207.99 |
| 9,275,285 B2 * | 3/2016 | Srinivasan | G06K 9/00221 |
| 2004/0090453 A1 * | 5/2004 | Jasinschi | G11B 27/28 715/723 |
| 2005/0212913 A1 * | 9/2005 | Richter | G06K 9/00228 348/170 |
| 2007/0286477 A1 | 12/2007 | Kim et al. | |

(Continued)

FOREIGN PATENT DOCUMENTS

EP    2767930    8/2014

OTHER PUBLICATIONS

Hsieh, et al. (Visual people counting using gender features and LRU updating scheme), Springer, Sep. 2013, pp. 1741-1759.*

(Continued)

*Primary Examiner* — Daniel Mariam
(74) *Attorney, Agent, or Firm* — Samuel M. Katz

(57) ABSTRACT

In one embodiment, a method for detecting faces in video image frames is implemented on a computing device including: comparing current image frames to previously processed image frames to determine similarity, if a current image frame and a previously processed image frame are dissimilar, comparing a location within the current image frame for at least one detected facial image to a location within an associated image frame for at least one most recently stored facial image stored in a most recently used (MRU) cache, if the compared locations are dissimilar, comparing the at least one detected facial image to the at least one most recently stored facial image stored in the MRU cache to determine similarity, and storing the at least one detected facial image in the MRU cache if the at least one detected facial image and the at least one most recently stored facial image are not dissimilar.

20 Claims, 8 Drawing Sheets

(56) References Cited

U.S. PATENT DOCUMENTS

| | | |
|---|---|---|
| 2009/0285488 A1 | 11/2009 | Li |
| 2010/0067745 A1* | 3/2010 | Kovtun .............. G06K 9/00711 |
| | | 382/106 |
| 2012/0114172 A1 | 5/2012 | Du et al. |
| 2013/0148898 A1 | 6/2013 | Mitura et al. |
| 2014/0086450 A1 | 3/2014 | Huang et al. |
| 2014/0161326 A1 | 6/2014 | Ganong et al. |
| 2014/0226877 A1* | 8/2014 | Je ....................... G06K 9/00288 |
| | | 382/118 |
| 2015/0379330 A1 | 12/2015 | Srinivasan et al. |

OTHER PUBLICATIONS

Lee, Hyobin et al, Face Detection Using Multi-Modal Features, Oct. 17, 2008.
OPENCV, Cascade Classification, Dec. 20, 2010.
Poon, Phillip K, Image Denoising With Singular Value Decomposition and Principal Component Analysis, Dec. 8, 2009.
Tang, Yichuan et al, Robust Boltzmann Machines for Recognition and Denoising, Jun. 16, 2012.
Vijaya, G. et al, A Simple Algorithm for Image Denoising Based on MS Segmentation, Jun. 6, 2010.
Wang, Jin et al, Fast Non-Local Algorithm for Image Denoising, Oct. 8, 2006.
Bradski, Gary et al: Chapter 7: Histograms and Matching; In Learning OpenCV-Computer Vision with the OpenCV Library, Jan. 1, 2008, XP055291589, pp. 193-221.
Examination and Search Report issued on Aug. 5, 2016 by the European Patent Office in corresponding application No. EP16162673.4.
Schulte, Matthias; "Real-time feature extraction from video stream data for stream data segmentation and tagging" (2013).

* cited by examiner

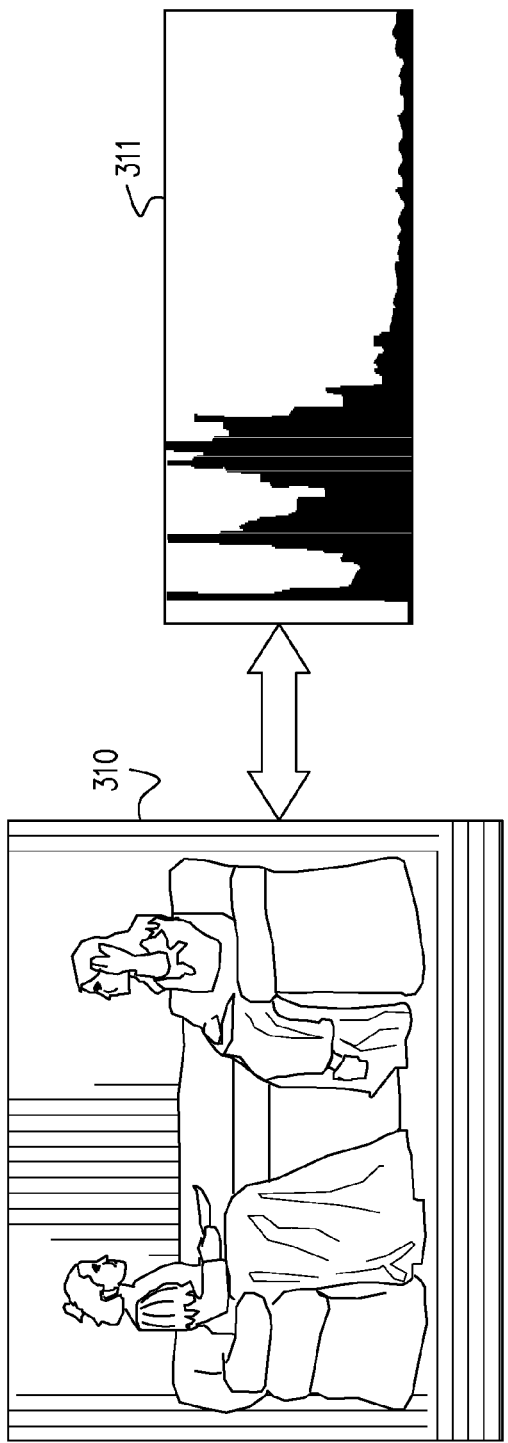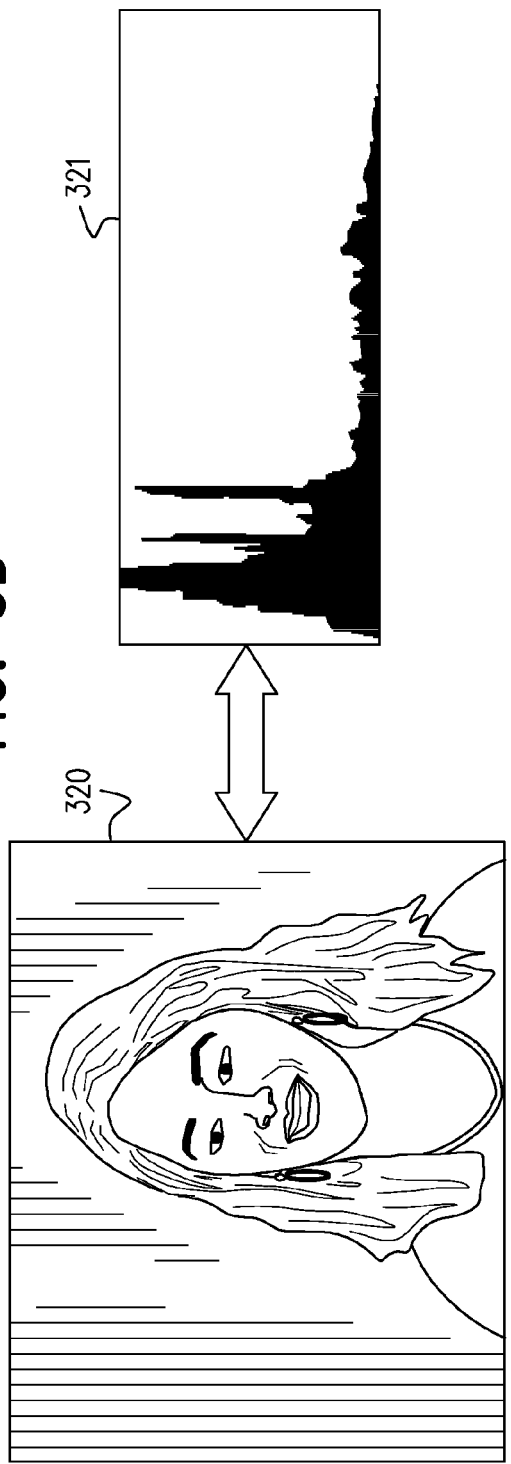

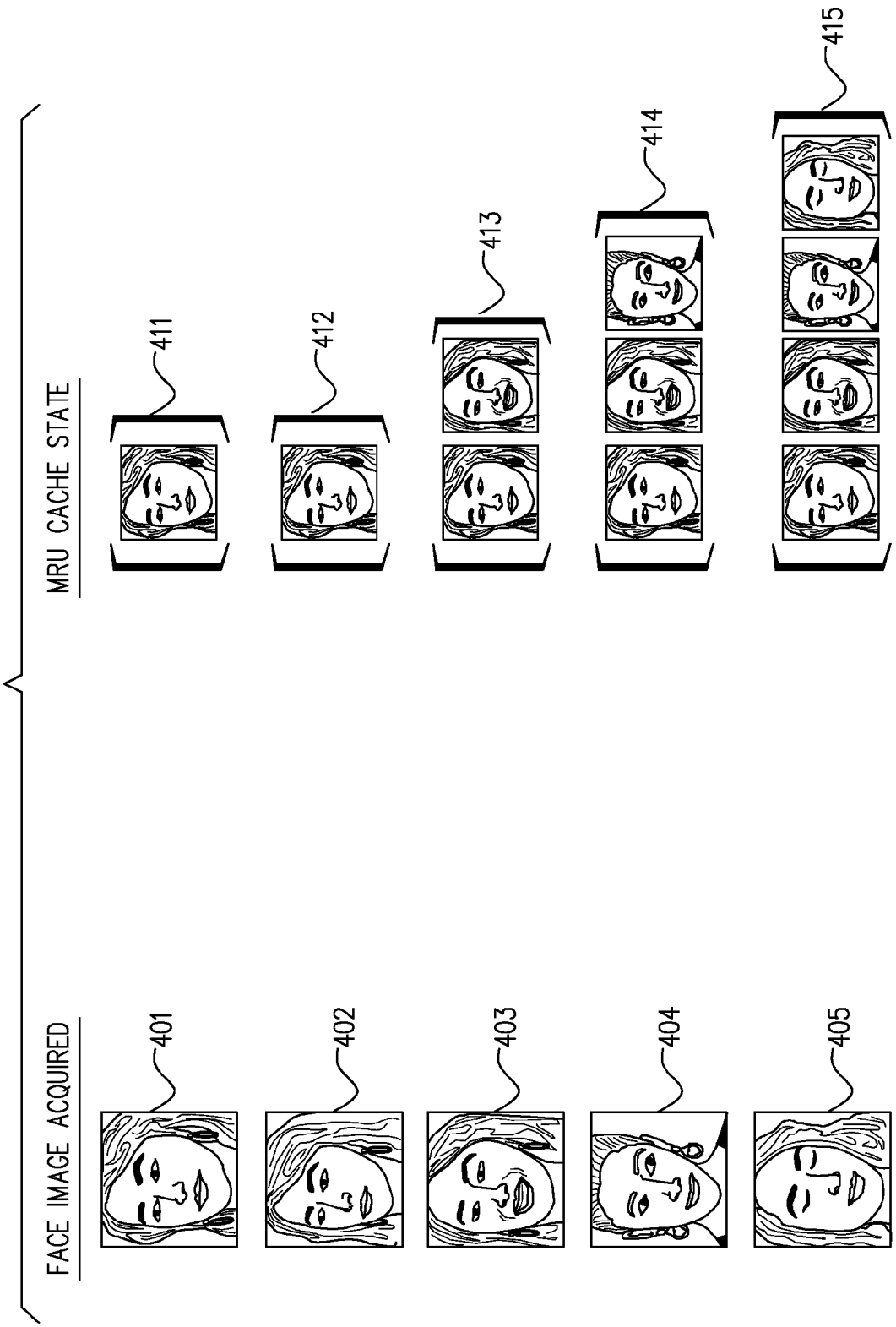

```
Begin
  Init input_video
  Init MRUcache
  Init Frame=Frame^O
  for T in GetFrames(input_video)
    if CheckSimilarity(Frame^T, NewFrame) is FALSE
      Frame=Frame^T
      Faces=ExtractFacesWithSubFeatures(Frame)
      for K in Size(Face)
        if CheckSimilarityInCache(Faces^K, MRUCache) is FALSE
          AddToMRUCache(Faces^K)
End
```

DUPLICATE REDUCTION FOR FACE DETECTION

FIELD OF THE INVENTION

The present invention generally relates to face detection in video images.

BACKGROUND OF THE INVENTION

Face detection is a process by which the presence of a face is detected in a digital image. The results of the face detection process are often used as input to applications providing, for example, face recognition, animation or security. U.S. patent application Ser. No. 14/453,967, entitled "Entropy-Reducing Low Pass Filter for Face-Detection Face", filed on Aug. 7, 2014, and assigned to the common assignees of the present invention, discloses an entropy-reducing method for face detection from among video images.

BRIEF DESCRIPTION OF THE DRAWINGS

The present invention will be understood and appreciated more fully from the following detailed description, taken in conjunction with the drawings in which:

FIGS. 3A, 3B and 4 are illustrations of exemplary image data processed by the process of FIG. 2;

FIG. 5 is an illustration of pseudo code for an exemplary implementation of the process of FIG. 2;

DESCRIPTION OF EXAMPLE EMBODIMENTS

Overview

A method for detecting faces in video image frames is implemented on a computing device and includes: comparing a current image frame to a previously processed image frame to determine similarity based on a threshold percent of deviance between the current and previously processed image frames, discarding the current image frame if the current image frame and the previously processed image frame are similar according to the comparing of image frames, if the current image frame and the previously processed image frame are not similar according to the comparing of image frames, detecting at least one detected facial image in the current image frame, comparing a location within the current image frame for the at least one detected facial image to a location within an associated image frame for at least one most recently stored facial image stored in a most recently used (MRU) cache, discarding the at least one detected facial image if the location with the current frame and the location within an associated image frame are similar according to the comparing of locations, if the location within the current image frame for the at least one detected facial image and the location within an associated image frame are not similar according to the comparing of locations, comparing the at least one detected facial image to the at least one most recently stored facial image stored in the MRU cache to determine similarity based on a threshold percent of deviance between the detected and most recently stored facial images, discarding the at least one detected facial image if the at least one detected facial image and the at least one most recently stored facial image are similar according to the comparing of facial images, storing the at least one detected facial image in the MRU cache if the at least one detected facial image and the at least one most recently stored facial image are not similar according to the comparing of image frames.

Detailed Description of Example Embodiments

Face-detection functionality is available out-of-the-box from some image processing libraries, for example, OpenCV, originally developed by Intel Research and now supported by Willow Garage and Itseez. However, it will be appreciated that such functionality may have been developed originally for use with still images. Accordingly, such functionality may typically employ a "binary" approach: for a single given image, a face is either detected, or it is not. When such an approach is applied to broadcast video, the results may therefore be rather "noisy", with repeated redundant processing of similar recurring images within a video stream. Face detection for broadcast video may therefore suffer from a heightened state of entropy (vis-à-vis face detection for still images) as each noisy result, e.g. redundant images, false positives, etc., makes it progressively more difficult to isolate "true" results.

Figure 1:
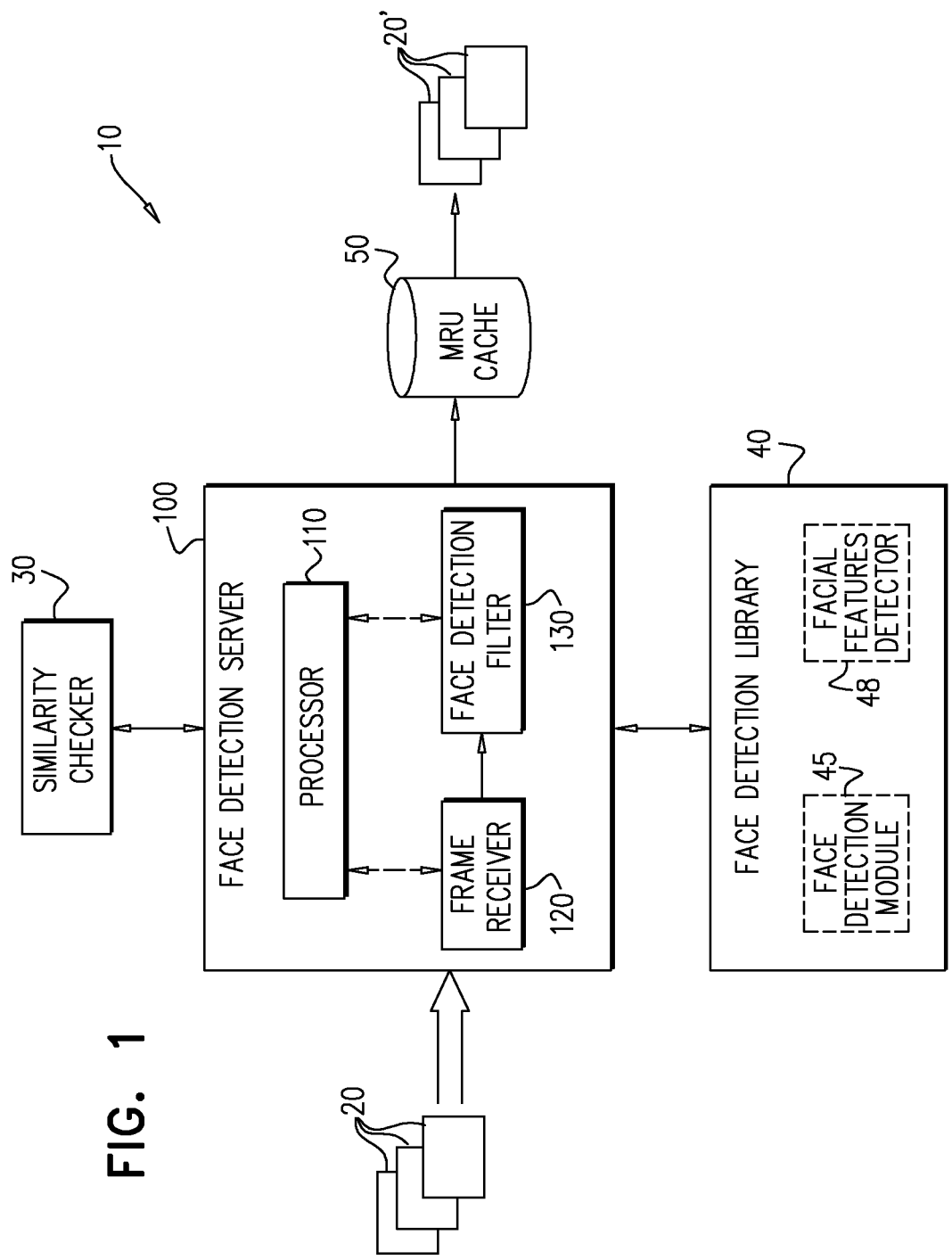
FIG. 1 is a simplified pictorial illustration of an entropy-reducing low pass filter system for face detection, constructed and operative in accordance with embodiments described herein.

Accordingly, it will be appreciated that commonly available face detection functionality may require modification in order to provide more suitable processing of broadcast video. Reference is now made to FIG. 1 which illustrates an entropy-reducing low pass filter face detection system 10, constructed and operative in accordance with embodiments described herein. System 10 comprises face detection server 100, similarity checker 30, face detection library 40 and MRU (most recently used) cache 50. It will be appreciated that the depiction of similarity checker 30 and face detection library 40 as independent modules may be exemplary. In some embodiments described herein, the functionalities of either similarity checker 30 and/or face detection library 40 may be implemented as one or more components of face detection server 100.

Face detection server 100 comprises hardware and software components, such as are well-known in the art. Face detection server 100 also comprises at least one processor 110 and frame receiver 120. It will be appreciated that face detection server 100 may comprise more than one processor 110. For example, one such processor 110 may be a special purpose processor operative to detect faces in a broadcast stream according to a method described herein. Processor 110 may be operative to execute instructions stored in a memory (not shown) in order to perform the herein described method to detect faces in a broadcast stream. Frame receiver 120 may be any hardware or software component operative to use protocols such as are known in the art to receive video frames 20 from a video stream. Non-limiting examples of frame receiver 120 may include a transceiver or a dedicated receiver. MRU cache 50 may be implemented with any suitable digital storage device operative to store digital images.

Figure 2:
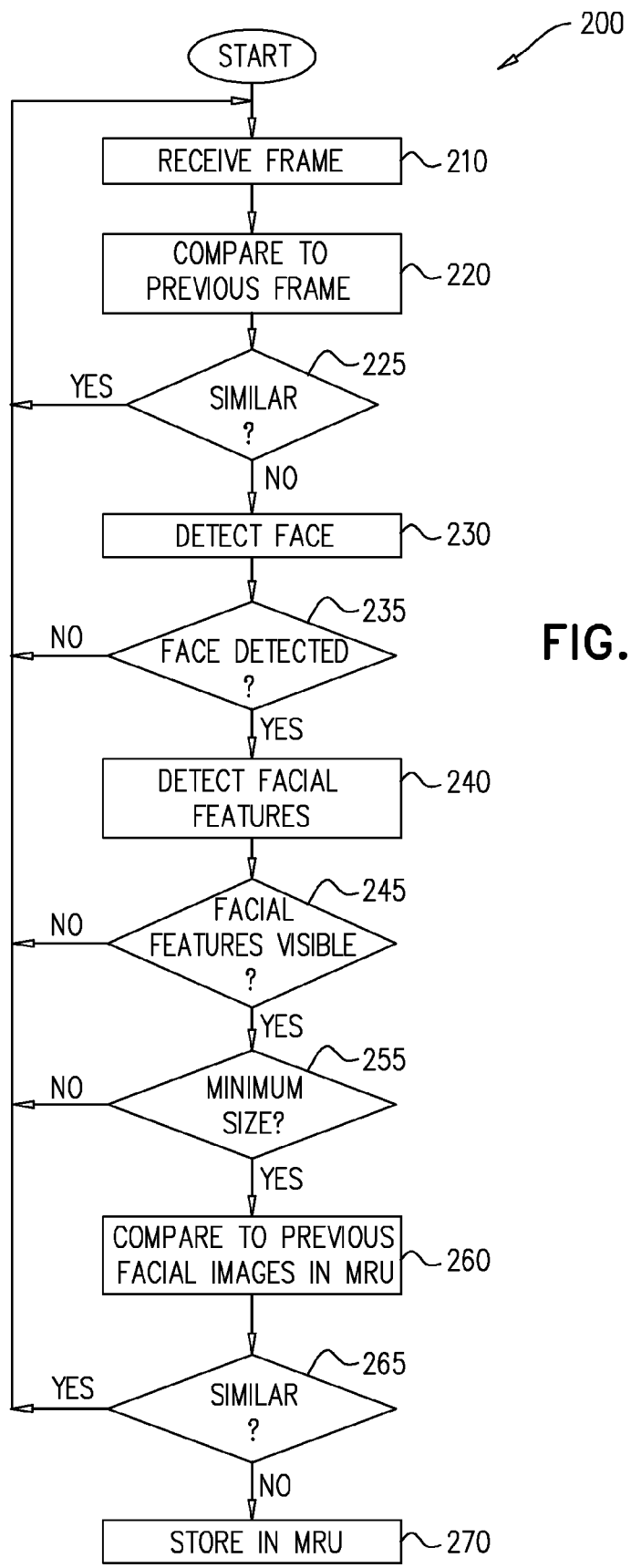
FIG. 2 is a flow chart of a process run by the system of FIG. 1.

Reference is now made also to FIG. 2 which illustrates an entropy-reducing low pass filtering process 200 to be performed by system 10 in accordance with embodiments described herein. Frame receiver 120 may receive (step 210) an image frame 20. It will be appreciated that frames 20 may be received from any suitable source. In accordance with an exemplary embodiment described herein, image frames 20 may be received from a video broadcast stream. It will be appreciated that image frames 20 may be received via other media as well, including, for example, but not limited to, DVD, tape cassettes and other forms of digital storage.

Face detection server 100 may also comprise face detection filter 130. Face detection filter 130 may be a hardware or software component operative to filter results of the face detection functionalities used by face detection server 100, thereby reducing entropy that may be inherent in using known methods for face detection for video broadcast images. Face detection filter 130 may invoke similarity checker 30 to compare (step 220) the image frame received in step 210 to a previous image frame received in step 210. It will be appreciated, that for the first pass through process 200, there may be no previous image frame to compare in step 220. It will also be appreciated that process 200 may not necessarily process each available image frame. For example, in a typical video broadcast stream, there may be twenty five image frames per second of video. Process 200 may be configured to process a sample of image frames, i.e. face detection filter 130 may be configured to process a configurable number of image frames per second. It will also be appreciated that some types of image frames may be better candidates for face detection. I-frames comprise full image data; whereas B-frames and P-frames may comprise only partial image data. Accordingly, in some embodiments described herein, process 200 may be configured to process only I-frames, or at least to favor the processing of I-frames over that of B-frames and P-frames.

It will similarly be appreciated that when processing video image frames, even if the camera shot remains steady and there is no movement of the actors, there may still be slight, immaterial differences between the images from frame to frame. For example, in the background, trees branches may be affected by the wind or the water in a river may be flowing. In such cases, while the images depicted may not be identical, there may be no material differences vis-à-vis the objective of face detection.

In accordance with embodiments described herein, similarity checker 30 may be operative to use color histograms to check the similarity of two or more given images. Accordingly, similarity checker 30 may be a software or hardware component operative to convert the image frames 20 to color histograms in order to provide a quantifiable limit for material/immaterial differences. Alternatively, other techniques known in the art for determining if two images are similar may also be used by similarity checker 30. Comparison of color histograms is given by way of example only.

Reference is now made to FIGS. 3A and 3B which illustrate exemplary conversions of image frames 20 to color histograms for purposes of comparison. Image frames 310 and 320 depict two image frames 20 that may represent two images that may be produced in the context of a typical talk show. Image frame 310 depicts two women facing each other on a couch. Image frame 320 depicts a close-up of the woman on the right. It will be appreciated that for the purposes of face detection, the differences in size and pose between the images may render the images dissimilar even if the same women may be depicted in both images, as in FIGS. 3A and 3B.

Color histograms 311 and 321 represent exemplary color histograms generated from image frames 310 and 320 respectively. It will be appreciated that any known utility or suitable method may be used to generate color histograms 311 and 321. For example, an image processing library such as OpenCV may be employed to bin the pixel color intensities of the original images (i.e. image frames 310 and 320) into a hue saturation and luminosity color scheme to yield color histograms 311 and 321. It will be appreciated that while color histograms 311 and 321 are represented in FIGS. 3A and 3B in black and white, in practice they may also be differentiated by color.

It will also be appreciated that such color histograms may serve as a proxy for the original image frames, and as such may be quantifiably compared to determine whether the images from image frames 310 and 320 are similar. It will further be appreciated that a configurable limit may be defined to facilitate the determination of whether two given color histograms represent similar or dissimilar image frames 20. For example, similarity may be determined according to an average deviance between corresponding columns in the color histograms of FIGS. 3A and 3B. If the average deviance is greater than a threshold percentage, e.g. 1%, 5%, 10%, etc., then the image frames may be determined to be dissimilar. Alternatively or in addition, dissimilarity may be indicated by a more significant deviance in one or more individual columns, e.g. 25%, 40%, 50%, etc.

Returning to the discussion of FIG. 2, if the current image frame and the previous image frame are similar (step 225), i.e. there is no material difference between the two image frames, as determined by color histogram analysis, described above with reference to FIGS. 3A and 3b, then there may be no need to process the current image frame any further. It may be assumed that if there is a face in the current image, then it was already detected when the previous image frame was processed. Similarly, if there is no face in the current image frame, then the previous image frame presumably also lacked a face. Accordingly, if the current image frame is similar to the previous image frame (step 225), the current image frame may be discarded and control may return to step 210.

If the current image frame is not similar to the previous image frame (step 225), then control may proceed to step 230. For example, assuming that FIG. 3A represents a color histogram conversion of a previous image frame 20 and FIG. 3B represents a color histogram conversion of a current image frame 20, the results of step 225 may be "No", i.e., that the images are not similar.

Face detection library 40 may comprise face detection module 45 and facial features detector 48. In accordance with embodiments described herein, face detection library 40 may be implemented with any known functionalities for face detection and the detection of facial features in an image. For example, face detection library 40 may be implemented using OpenCV, Python Imaging Library, Betaface or KeyLemon.

Face detection filter 130 may use face detection module 45 to detect (step 230) a face in the current image frame. If a face is not detected in the current image frame (step 235), the image frame may be discarded and control may return to step 210. Otherwise, if one or more faces are detected in the current image frame (step 235), process 200 may continue to step 240. It will be appreciated that depending on the configuration of face detection filter 130, non-human faces (e.g. animal faces or monster/alien faces from horror/science fiction movies) may or may not be detected as faces in step 235.

It will be appreciated that not all of the facial images detected in step 230 may be of the same utility for downstream uses. For example, a common downstream use may be to perform face recognition processing on the detected face to identify the person or persons in the image frame. The processing of partial face images, i.e. where one or more facial features may not be in the image, may generally yield poorer results than the processing of full facial images. Accordingly, the output of process 200 may be improved by filtering out facial images without a complete set of facial features.

Face detection filter 130 may therefore employ facial features detector 48 to determine whether a facial image detected in the current image frame is missing any facial features. For example, facial features detector 48 may be configured to attempt to detect (step 240) whether a given facial image has at least two eyes, a mouth and two ears. If all the required facial features are not visible; i.e., the images are not detected in a facial image (step 245), the image frame may be discarded and control may return to step 210. Otherwise, if one or more faces with a full set of features are detected in the current image frame (step 245), process 200 may continue to step 255. It will be appreciated that the configuration of facial features detector 48 as described hereinabove may be exemplary; embodiments described herein may provide support for other configurations as well. For example, facial features detector 48 may alternatively be configured with required features of at least two eyes, a nose and a mouth.

It will similarly be appreciated that the quality of downstream processing or usage of a detected face may be at least in a part a function of the size of the detected face. Accordingly, face detection filter 130 may be configured to determine whether a given detected facial image is of a minimum size, i.e. that the detected facial image comprising a certain configurable number of pixels and/or that it meets configurable requirements for dimensions in terms of pixels. If face detection filter 130 determines that the current image frame does not comprise a facial image of a minimum size (step 255), the image frame may be discarded and control may return to step 210. Otherwise, if one or more faces of a minimum size are detected in the current image frame (step 255), process 200 may continue to step 260.

As discussed hereinabove, by comparing the current and previous frame as per steps 220 and 225, process 200 may filter out consecutive instances of generally similar image frames. However, steps 220 and 225 may not prevent repeated instances of generally similar image frames and/or generally similar detected facial images if they do not appear in consecutive image frames as the video stream is processed. For example, if two generally similar facial images appear in two different image frames separated by a third image frame with no facial images detected, then neither of the generally similar facial images may be filtered out by step 225.

In accordance with embodiments described herein, MRU cache 50 may be operative to store facial images that successfully pass through the filtering of process 200, i.e. facial images of at least a minimum size comprising a complete set of facial features. Before a current facial image may be stored in MRU cache 50, it may be compared to a previously stored facial image to filter redundant results.

Reference is now also made to FIG. 4 which depicts, on the left side, a series of exemplary facial images acquired for processing by process 200 and, on the right side, the state of MRU cache 50 as each of the exemplary facial images may be processed. Face detection filter 130 may compare (step 260) a current facial image, such as, for example, facial image 401 with the most recent entry in MRU cache 50. It will be appreciated that step 260 may be performed in a generally similar manner as step 220, i.e. using color histograms and/or any other suitable method for comparing two digital images. If the current facial image is similar to the most recently entered facial image in MRU cache 50 (step 265), the current facial image may be discarded and control may return to step 210. Otherwise, control may flow through to step 270.

In the example of FIG. 4, facial images 401, 402, 403, 404 and 405 may represent an exemplary sequence of five facial images to be processed by step 260. It will be appreciated that these exemplary facial images may or may not have appeared in consecutive image frames 20 processed by process 200; other image frames may have been filtered out in previous steps of process 200. Facial image 401 may be the first facial image processed. Accordingly, there may be no most recent entry in MRU cache 50 and face detection server 100 may store (step 270) facial image 401 in MRU cache 50. Accordingly, after process 200 processes facial image 401, MRU cache state 411 may represent the state of MRU cache 50.

It will be appreciated that facial image 402 may be generally similar to facial image 401; even though the depicted pose may be slightly different, the images may be sufficiently similar such that they do not pass the configured threshold percentage of deviation required to determine dissimilarity in step 260. Accordingly, when facial image 402 may be processed by step 265, control may return to step 210 and MRU cache 50 may not be updated; MRU cache state 412 may therefore be identical to MRU cache state 411.

Facial image 403 may represent yet a different pose of the same person depicted in facial images 401 and 402. However, it will be appreciated that the pose of facial image 403 may be significantly different than that of facial image 401, and that step 260 may compare whether or not the images are similar; not necessarily whether or not they depict the same person. Accordingly, step 260 may determine that facial images 403 and 401 are dissimilar and MRU cache 50 may be updated as per MRU cache state 413.

Facial image 404 as depicted represents a different person than that depicted in facial images 401, 402 and 403. Accordingly, MRU cache 50 may be updated as per MRU cache state 414. Facial image 405 may represent yet a different pose of the same person depicted in facial images 401, 402 and 403. Accordingly, MRU cache 50 may be updated as per MRU cache state 415.

It will be appreciated by one of skill in the art that the order of the steps in process 200 may be exemplary; the system of FIG. 1 may be configured to perform the steps of process 200 in any suitable order that may provide the same general functionality. For example, the order of decision steps 245 and 255 may be interchanged within the scope of process 200.

It will be appreciated that the format of the facial images as stored in MRU cache may be a function of the requirements of a downstream application. For example, in accordance with embodiments disclosed herein, just the facial image itself may be stored in MRU cache 50. Alternatively, a minimal bounding rectangle encompassing the facial image plus some of the original image surrounding the facial image may be stored in MRU cache 50. Alternatively, the minimal bounding rectangle may be extended to include a border of x pixels where possible given the constraints of the original image frame.

In accordance with an embodiment described herein, face detection server 100 may periodically or episodically delete some or all of the contents of MRU cache 50 to remove the least recently used entries, thereby rendering filtered image frames 20. For example, after x iterations of process 200, some or all of the contents of MRU cache 50 may be deleted to remove facial image 401 from MRU cache state 415.

It will be appreciated that process 200 may be repeated until there are no more image frames 20 to process.

In accordance with some embodiments described herein, step 260 may include the comparison of a facial image to more than one recent entry in MRU cache 50. It will be appreciated that in such manner, the contents of MRU cache 50 may be further filtered of redundant facial images.

Reference is now made to FIG. 5 which illustrates a listing of pseudo code for an exemplary implementation of process 200. As shown in FIG. 5, the input video stream, MRU cache 50 and a frame counter are initialized at the beginning of the process. Each image frame 20 received from the input video stream is compared to the previously received image frame 20. Non-similar image frames are processed to extract facial images with full sets of facial features. If the detected facial images are at least of minimum size, they may then be compared to one or more images in MRU cache 50. Non-similar facial images are then added to MRU cache 50.

It will be appreciated by a person of skill in the art that the location of a person's facial image within an image frame may be a function of a variety of factors. For example, the person's height may contribute to how "high" the facial image appears in the image frame. The camera angle and zoom level may also affect the location of the facial image within the fame. Accordingly, the facial images of two different persons in the same scene may typically be located in different locations of the image frame. Conversely, if two facial images appear in the same location within a small set of image frames, it is likely that they belong to the same person.

It will be appreciated that an image frame is comprised of a grid of pixels, where the number of columns and rows of pixels is a function of the resolution of the image frame. The location of a facial image within an image frame may therefore be expressed as a set of x,y coordinates, where x is the column and y is the row of each of the pixels associated with the facial image. Relative location of two facial images in two different image frames may therefore be determined by comparing the associated sets of x,y coordinates.

Figure 6A:
FIGS. 6A-C are illustrations exemplary image data processed by the process of FIG. 7.
Figure 6B:
Figure 6C:
Figure 7:
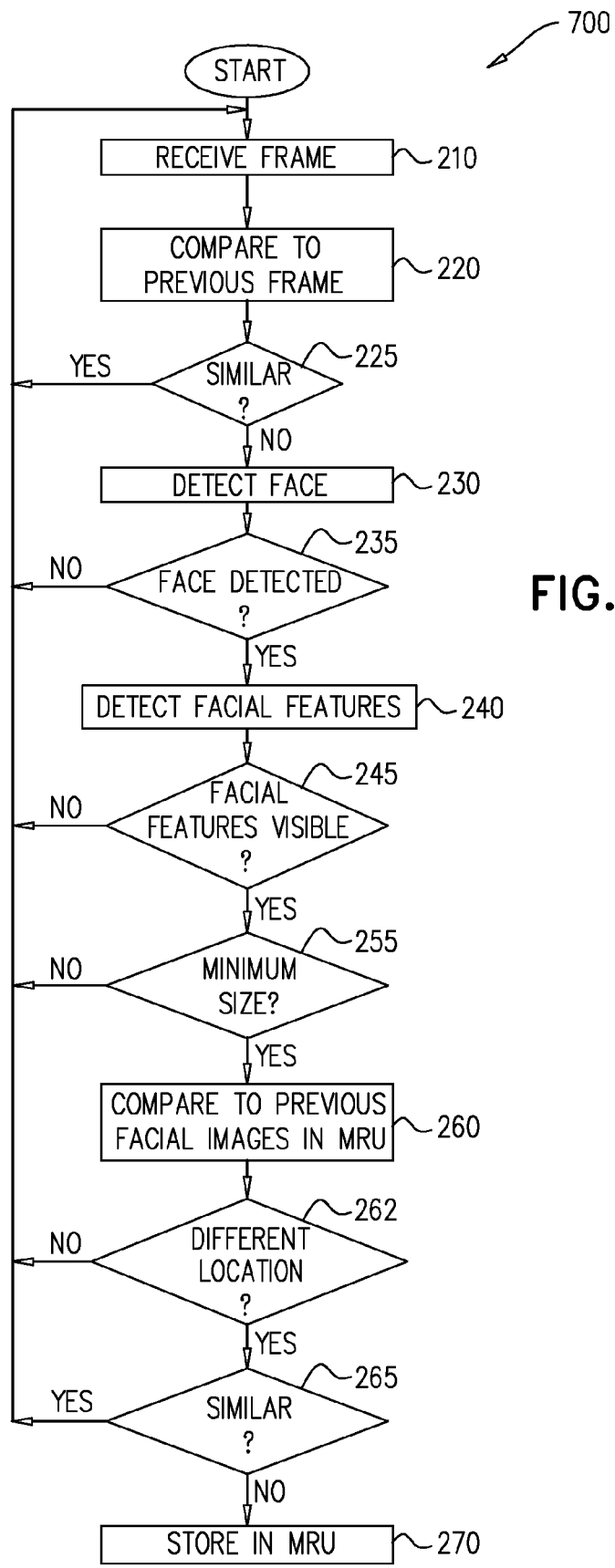
FIG. 7 is a flow chart of a process run by the system of FIG. 1.

Reference is now made also to FIGS. 6A-C which respectively depict exemplary image frames in which facial images 401, 403 and 405 (FIG. 4) are positioned. Reference is also made to FIG. 7 which illustrates an enhanced entropy-reducing low pass filtering process 700 to be performed by system 10 in accordance with embodiments described herein. It will be appreciated that process 700 is generally similar to process 200 with the exception of added functionality for step 260 and added step 262; similar reference numerals refer to similar functionality in the two processes.

As described hereinabove, exemplary facial images 401 and 403 are of the same person in different poses. When compared in step 260 of process 200, the difference in pose may be significant enough that they may be determined to be non-similar (step 265). However, in process 700, the functionality of step 260 may be extended to include comparing the location of facial images 401 and 403 within their associated image frames. Since as depicted in FIGS. 6A and 6B facial images 401 and 403 are indeed in the same general location (step 262), the current facial image may be discarded and process control may return to step 210 without continuing to step 270; process 700 may not add facial image 403 to MRU cache 50.

Exemplary facial image 405 as depicted in FIG. 6C may also be of the same person as exemplary facial images 401 and 403 in FIGS. 6A and 6B. However, facial image 405 may be located in a different location of the associated image frame. For example, the person may have moved, or a different camera may have been used to capture the image. When processing facial image 405, the result of step 262 may therefore be "YES" and process control will flow through to step 270.

Figure 8:
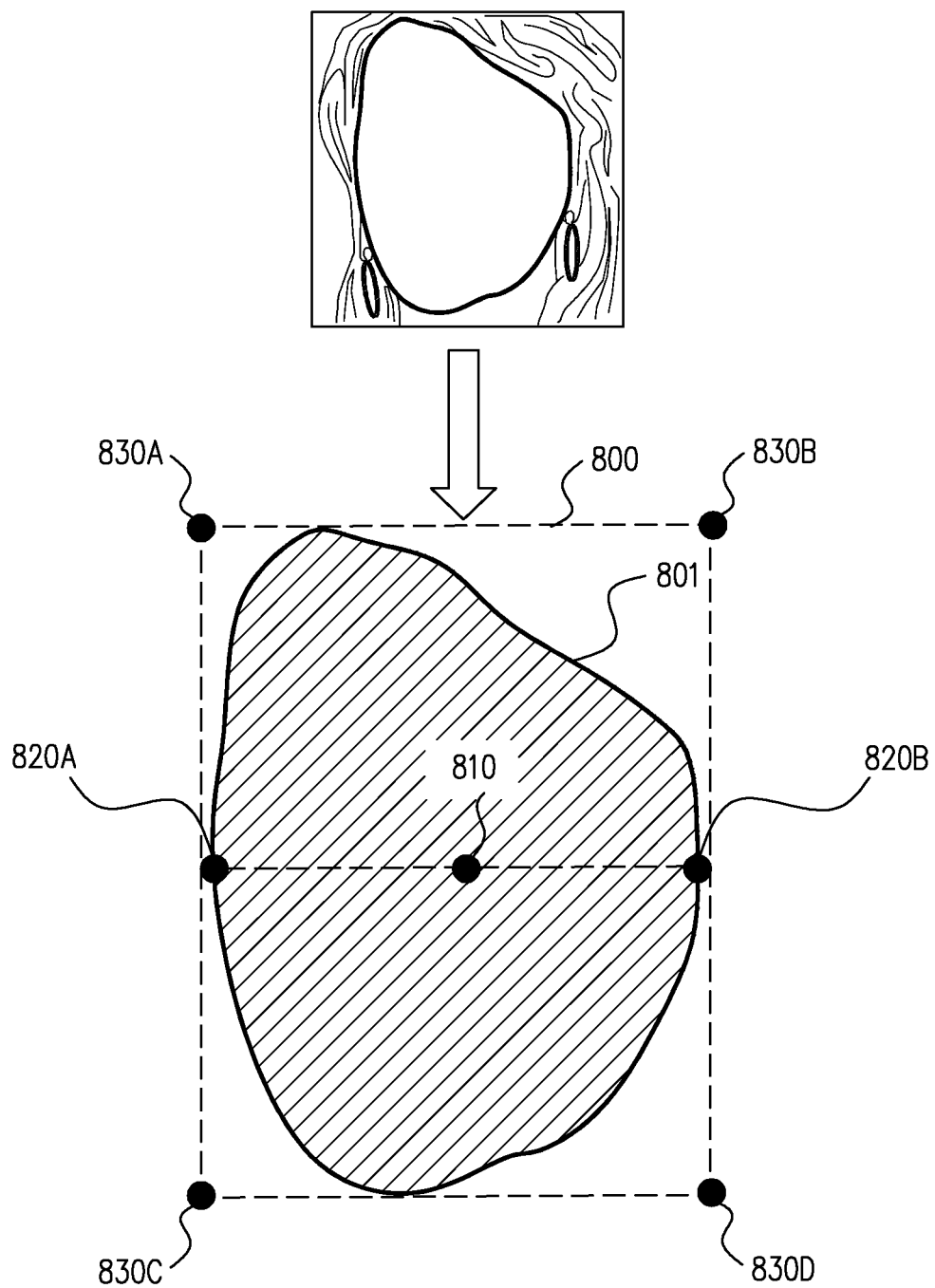
FIG. 8 is an illustration of an alternative representation of an image frame such as depicted in FIGS. 6A-C.

Reference is now made to FIG. 8 which depicts an exemplary image frame 800 that may be used to illustrate how the location of facial images within image frames may be determined and compared in order to derive the outcome of step 262. Image frame 800 may represent an alternative representation of an image frame with a facial image such as the image frames depicted in FIGS. 6A-C. Image frame 800 comprises facial silhouette 801, facial center point 810, facial width endpoints 820A-B and facial corner points 830 A-D.

It will be appreciated that facial silhouette 801 may generally correspond to the borders of a facial image such as, for example, facial image 401 as represented in FIG. 4 and/or FIG. 6A. Facial center point 810 may generally correspond to a centermost point within facial silhouette 801 as defined by a corresponding set of x,y coordinates. Facial width endpoints 820 A-B may represent the endpoints of the greatest width of silhouette 801; the dashed line between facial width endpoint 820A and facial width endpoint 820B may therefore represent the width of the associated facial image. Facial corner points 830 A-D together form a minimal bounding rectangle around silhouette 801 such that each line of the minimal bounding rectangle intersects once with the border of silhouette 801.

The outcome of step 262 may be determined using any one, or any combination of, the following tests:

The x,y coordinates of facial center points 810 for the facial images may be compared. For example, if the difference between the x,y coordinates for facial center point 810 in one facial image and the x,y coordinates for facial center point 810 in a second facial image exceeds 100 pixels, the facial images may be determined to be non-similar.

Alternatively, or in addition, facial width endpoints 820 A-B for the facial images may be compared. For example, if the difference between the x,y coordinates for facial width endpoint 820A in one facial image and the x,y coordinates for facial width endpoint 820A in a second facial image exceeds ten pixels, the facial images may be determined to be non-similar. Similar logic may be used to compare facial width endpoints 820B in the two facial images.

Alternatively, or in addition, the length of the width of the two facial images as defined by facial width endpoints 820A and 820B may be compared. It will be appreciated that since the width may be represented along the x axis, the y coordinate may be constant for both facial width endpoints 820A and 820B. Therefore the length of the width of a given facial image may be determined by the difference between the x coordinates for facial width endpoints 820A and 820B. If, for example, the difference in length of width for two facial images exceeds ten pixels, the facial images may be determined to be non-similar.

It will be appreciated that depending on its positioning in the image frame, the width of silhouette 801 may not necessarily be equivalent to the width of the minimal bounding rectangle defined by facial corner points 830A-D. Alternatively, or in addition, the width of the minimal bounding rectangle (for example, as defined by: the line between facial corner point 830A and facial corner point 830B; or the line between facial corner point 830C and facial corner point 830D) may be used for comparing two facial images instead of facial image width. Alternatively, or in addition, the height of the minimal bounding rectangle (for example, as defined by: the line between facial corner point 830A and facial corner point 830C; or the line between facial corner point 830B and facial corner point 830D), may also be used for comparing the two facial images.

Alternatively, or in addition, facial corner points 830 A-D for the facial images may be compared. For example, if the difference between the x,y coordinates for facial corner point 830A in one facial image and the x,y coordinates for facial corner point 830A in a second facial image exceeds twenty-five pixels, the facial images may be determined to be non-similar. Similar logic may be used to compare facial corner points 830B, 830C and 830D in the two facial images.

It will be appreciated by one of skill in the art that the pixel threshold values may be configurable; the herein disclosed embodiments may support the definition of any suitable pixel threshold for similarity in step 262.

It will be appreciated that the implementation of similarity checker 30 using color histograms for comparison may be exemplary. Embodiments described herein may provide support for any suitable method for comparing two digital images. For example, similarity checker 30 may also be implemented using other known methods such as, for example, SIFT (scale-invariant feature transform) or SURF (speeded-up robust features), or even methods for face recognition which may serve as a proxy for checking similarity.

It will be appreciated that processes 200 and/or 700 as described herein may be leveraged to detect scene boundaries in a video stream. For example, multiple "no" results in steps 220 and/or 260 may indicate that the image frames being processed belong to a single ongoing scene. A spike in the rate of the turnover of the contents of MRU cache 50 may indicate that a new scene may be beginning. In accordance with an embodiment described herein, the flow-through rate of steps 220 and/or 260 may be monitored; a temporary increase in flow may indicate a scene boundary. Alternatively or in addition, the storage rate in MRU cache 50 may also be monitored in generally the same manner. Similarly, system 10 may detect scene boundaries based as a function of the combined flow-through rate for steps 220 and 260.

It will be appreciated that system 10 and processes 200 and/or 700 as described hereinabove may provide entropy-reducing solutions for face detection in a video broadcast environment. When compared to typical face detection in a population of still images, system 10 may process a population of broadcast video images to achieve results with an improved ratio of quality to quantity, i.e. fewer facial images, but of higher quality, and with less false positive identifications. Accordingly, downstream applications processing the output of system 10 may receive more ordered, qualified and quality facial images for further processing.

It will similarly be appreciated that system 10 may be configured to reduce entropy at more than one level. For example, system 10 may reduce entropy at the signal level by filtering out similar, i.e. redundant, image frames in step 225 of processes 200 and/or 700. System 10 may also reduce entropy at a metadata level through context-aware filtering. For example, system 10 may filter out lower quality facial images as per steps 245 and 255 of processes 200 and/or 700.

It will be appreciated that in some embodiments described herein, system 10 may be implemented as a central processing server, whereas downstream applications processing the output of system 10 may be distributed among multiple clients. For example, system 10 may be implemented as part of a video broadcast headend, and further processing of the output of system 10 may be performed at home client devices such as set-top boxes and other suitable computing devices operative to receive a video broadcast from the headend. It will therefore be appreciated that as a result of the improved quality/quantity ratio of the output from system 10, the home client devices downstream applications may require fewer resources to process the facial images detected by system 10.

It is appreciated that software components described herein may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments described herein.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for detecting faces in video image frames, the method implemented on a computing device and comprising:

comparing a current image frame to a previously processed image frame to determine similarity based on a threshold percent of deviance between said current and previously processed image frames;

discarding said current image frame if said current image frame and said previously processed image frame are similar according to said comparing of image frames;

if said current image frame and said previously processed image frame are not similar according to said comparing of image frames, detecting at least one detected facial image in said current image frame;

comparing a location within said current image frame for said at least one detected facial image to a location within an associated image frame for at least one most recently stored facial image stored in a most recently used (MRU) cache;

discarding said at least one detected facial image if said location within said current frame and said location within an associated image frame are similar according to said comparing of locations;

if said location within said current image frame for said at least one detected facial image and said location within an associated image frame are not similar according to said comparing of locations, comparing said at least one detected facial image to said at least one most recently stored facial image stored in said MRU cache to determine similarity based on a threshold percent of deviance between said detected and most recently stored facial images;

discarding said at least one detected facial image if said at least one detected facial image and said at least one most recently stored facial image are similar according to said comparing of facial images; and storing said at least one detected facial image in said MRU cache if said at least one detected facial image and said at least one most recently stored facial image are not similar according to said comparing of image frames.

2. The method according to claim 1 and also comprising:
attempting to detect a complete set of visible facial features in said at least one detected facial image;
and discarding said at least one detected facial image if said attempting is unsuccessful.

3. The method according to claim 1 and also comprising:
discarding said at least one detected facial image if said at least one detected facial image is less than a threshold size.

4. The method according to claim 1 and wherein said comparing a current image frame to a previously processed image frame comprises:
converting said current image frame to a color histogram; and
comparing said color histogram to a color histogram produced by converting said previously processed image frame to a color histogram.

5. The method according to claim 1 and wherein said comparing at least one detected facial image to at least one most recently stored facial image comprises:
converting said detected facial image to a color histogram; and
comparing said color histogram to a color histogram produced by converting said at least one most recently stored facial image to a color histogram.

6. The method according to claim 1 and also comprising deleting least recently used contents of said MRU cache.

7. The method according to claim 6 and wherein said deleting is performed according to a schedule.

8. The method according to claim 6 and wherein said deleting is performed to enforce a maximum number of entries in said MRU cache.

9. The method according to claim 1 and also comprising providing facial images from said MRU cache to downstream applications.

10. The method according to claim 1 and also comprising detecting scene boundaries based on a lower rate for said discarding a current image frame.

11. The method according to claim 1 and also comprising detecting scene boundaries based on a higher rate for said storing.

12. The method according to claim 1 and also comprising: sampling an input stream of said video image frames to select said current image frame.

13. The method according to claim 12 and wherein said sampling comprises selecting from among I-frames in said input stream.

14. The method according to claim 1 and wherein said comparing a location comprises:

comparing x,y coordinates for a center point within said at least one detected facial image with x,y coordinates for a center point for said at least one most recently stored facial image.

15. The method according to claim 1 and wherein said comparing a location comprises:
comparing a width of said at least one detected facial image with a width of said at least one most recently stored facial image.

16. The method according to claim 1 and wherein said comparing a location comprises:
comparing x,y coordinates for a corner point of a minimal bounding rectangle encompassing said at least one detected facial image with x,y coordinates for a corner point of a minimal bounding rectangle encompassing said at least one most recently stored facial image.

17. A system for detecting faces in video image frames, the system implemented on at least one computing device and comprising;
a similarity checker operative to determine a degree of similarity between at least two said video image frames by comparing a current video image frame to a previously processed video image frame, wherein said degree of similarity is based on a threshold percent of deviance between said current and previously processed video image frames;
a face detection module operative to at least:
detect a face in a at least one of said video image frames, and
determine a location for said face within said at least one of said video image frames;
a most recently used (MRU) cache; and
a face detection server operative:
to filter out similar said video image frames based on results of said similarity checker
to employ said face detection module to detect facial images in non-filtered said video image frames; and
to store said facial images in said MRU cache.

18. The system according to claim 17 and wherein:
said system also comprises a facial features detector operative to detect facial features in said detected facial images; and
said face detection server is operative to discard said detected facial images for which a complete set of visible facial features is not detectable by said facial features detector.

19. The system according to claim 17 and wherein said system is operative to delete least recently used contents of said MRU cache.

20. A system for detecting faces in video image frames, the system implemented on a computing device and comprising:
means for comparing a current image frame to a previously processed image frame to determine similarity based on a threshold percent of deviance between said current and previously processed image frames;
means for discarding a current image frame if said current image frame and said previously processed image frame are similar according to said comparing;
means for detecting at least one detected facial image in said current image frame if said current image frame and said previously processed image frame are not similar according to said comparing of image frames;
means for comparing a location within said current image frame for said at least one detected facial image to a location within an associated image frame for at least one most recently stored facial image stored in an MRU cache;

means for discarding said at least one detected facial image if said location within said current frame and said location within an associated image frame are similar according to said comparing of locations;

means for comparing said at least one detected facial image to said at least one most recently stored facial image stored in said cache to determine similarity based on a threshold percent of deviance between said detected and most recently stored facial images;

means for discarding said at least one detected facial image if said at least one detected facial image and said at least one most recently stored facial image are similar according to said comparing of facial images; and means for storing said at least one detected facial image in said MRU cache if said at least one detected facial image and said at least one most recently stored facial image are not similar according to said comparing of image frames.

* * * * *

UNITED STATES PATENT AND TRADEMARK OFFICE
CERTIFICATE OF CORRECTION

Page 1 of 1

PATENT NO. : 9,619,696 B2
APPLICATION NO. : 14/686798
DATED : April 11, 2017
INVENTOR(S) : Aviva Vaknin et al.

It is certified that error appears in the above-identified patent and that said Letters Patent is hereby corrected as shown below:

In the Claims

Column 12, Claim 17, Line 20, "comprising;" to read as --comprising:--.

Column 12, Claim 17, Line 39 approx., "frames;" to read as --frames--.

Signed and Sealed this
Twelfth Day of September, 2017

Joseph Matal
*Performing the Functions and Duties of the
Under Secretary of Commerce for Intellectual Property and
Director of the United States Patent and Trademark Office*